US005259601A

United States Patent [19]

Vass

[11] Patent Number: 5,259,601

[45] Date of Patent: Nov. 9, 1993

[54] WORKTABLE AND VICECLAMP

[76] Inventor: Roger G. Vass, 1906 Springfield Ave., Salem, Va. 24153

[21] Appl. No.: 951,588

[22] Filed: Sep. 25, 1992

[51] Int. Cl.[5] .............................. B23Q 3/02

[52] U.S. Cl. .............................. 269/11; 269/16; 269/17; 269/45; 269/88; 269/96; 269/100; 269/900

[58] Field of Search .............................. 269/11, 15, 16, 17, 269/76, 99, 100, 96, 41, 43, 45, 900, 88

[56] References Cited

U.S. PATENT DOCUMENTS

| | | | |
|---|---|---|---|
| 1,305,321 | 6/1919 | Tooken | 269/99 |
| 1,432,725 | 10/1922 | Nolting | 269/11 |
| 1,515,915 | 11/1924 | Valenta | 269/100 |
| 1,953,814 | 4/1934 | McDevitt | 269/15 |
| 2,175,974 | 10/1939 | Shurtz | 269/45 |
| 2,774,134 | 12/1956 | Smith et al. | 269/45 |
| 2,817,892 | 12/1957 | Jones | 269/45 |
| 3,947,010 | 3/1976 | Zeller | 269/100 |
| 4,181,296 | 1/1980 | Bassett | 269/99 |
| 4,183,511 | 1/1980 | Marek | 269/17 |
| 4,819,922 | 4/1989 | Boike | 269/100 |
| 5,141,211 | 8/1992 | Adams | 269/17 |

*Primary Examiner*—Robert C. Watson

*Attorney, Agent, or Firm*—Patrick J. Walsh

[57] ABSTRACT

A worktable and particularly a worktable and vice-clamp of general utility for accomplishing a variety of tasks such as repair and service of equipment and tools.

12 Claims, 5 Drawing Sheets

WORKTABLE AND VICECLAMP

BACKGROUND OF THE INVENTION

The present invention relates to worktables and particularly to a worktable and viceclamp of general utility for accomplishing a variety of tasks such as repair and service of equipment and tools.

The prior art reveals a number of worktables or service stands intended for accommodating specific equipment in the course of repair or maintenance of the equipment. For example, U.S. Pat. No. 2,895,729 discloses a service stand for lawn mowers including an angle iron frame for receiving and supporting the mower at its wheels. U.S. Pat. No. 1,349,633 discloses a radiator stand having a special clamp fitting for accommodating a radiator and positioning it vertically, horizontally, or in intermediate position as required for repair of the radiator. The patents to Siebert U.S. Pat. No. 3,170,683 and Wilson U.S. Pat. No. 2,654,147 disclose special features for engine stands and U.S. Pat. No. 1,792,612 shows an airplane engine stand with a rotatable supporting platform. U.S. Pat. No. 4,771,980 discloses a support for small engines which can be rotated from horizontal to vertical.

In a machine shop or repair shop it is often necessary to repair or service a variety of equipment and tools such as lawnmowers, chain saws, weed wackers, power saws, sanders and so forth. As noted there are workstands available for specific equipment such as lawn mowers. However there is need for a worktable of general utility capable of receiving and holding a variety of tools and like for convenient repair and servicing. There is also need for a worktable equipped with a set of accessories such as vices and clamps for holding specific items of equipment and tools in suitable position for repair or servicing on the worktable.

SUMMARY OF THE INVENTION

The present invention is directed to a multipurpose work table with viceclamp and other accessories and comprises a table frame supported by a standard such as an engine stand which may be rolled to any desired location in a work shop. The table frame includes a pair of channels defining opposite sides of the table secured to horizontal front and rear support tubes. In one application for the worktable the channels support the wheels of a lawnmower under repair. A removable centerboard positioned between the channels and supported by the front and rear end tubes provides a flat work surface. The invention includes a set of accessories for clamping workpieces at several locations along the worktable. The front and rear end horizontal support tubes have open tubular sockets located at the four corners of the table for receiving one of the accessories for positioning a workpiece for repair or servicing. The workpiece can be held by one or more accessories for 360 deg. rotation about a horizontal or a vertical axis. A similar tubular socket for receiving accessories projects from the front end of the table allowing full rotation of a workpiece about horizontal or vertical axes. The accessories include a lamp, a tray, a vise, a screw clamp, a visegrip clamp, a universal tee connection, and an angle iron tee connection. The design of the table including the various support points and the accessories facilitate the repair of equipment and tools such as lawn mowers, chain saws, weed wackers, and so forth.

The worktable can be used in many different positions with a workpiece turned to any angle for repair or service. The table accommodates lawnmowers for operations such as crankcase oil change or blade removal without having to overturn the mower. The channels on opposite sides of the table are ideal trays for reserving bolts, dissassembled parts, and so forth of a workpiece. The accessories are stored on a cross bar beneath the table surface, and when not in use the worktable and its accessories can be rolled to a convenient storage location.

In a preferred arrangement of the invention, the worktable is supported in cantilever fashion from a support member such as an engine stand in a manner providing sufficient support for a variety of tools and equipment using the table. In specific applications of the worktable, an operator chooses a suitable location on the table for servicing a workpiece and proceeds to secure the workpiece in desired orientation at the location chosen by using one or a combination of accessories forming part of the invention.

OBJECTS OF THE INVENTION

It is an object of the invention to provide a multipurpose worktable.

It is an object of the invention to provide a worktable with a set of accessories including a viseclamp designed to accommodate various types of tools and equipment.

It is a further object of the invention to provide a multipurpose worktable with accessories mounted on an engine stand for support and mobility.

It is a further object of the invention to provide a set of accessories usable individually or in combination for a worktable to expand the utility of the worktable.

Other and further objects of the invention will occur to one skilled in the art with an understanding of the following detailed description of the invention or upon employment of the invention in practice.

DESCRIPTION OF THE DRAWING

A preferred embodiment of the invention has been chosen for purposes of illustrating the construction and operation of the invention and is shown in the accompanying drawing in which.

DETAILED DESCRIPTION OF THE INVENTION

Figure 1:
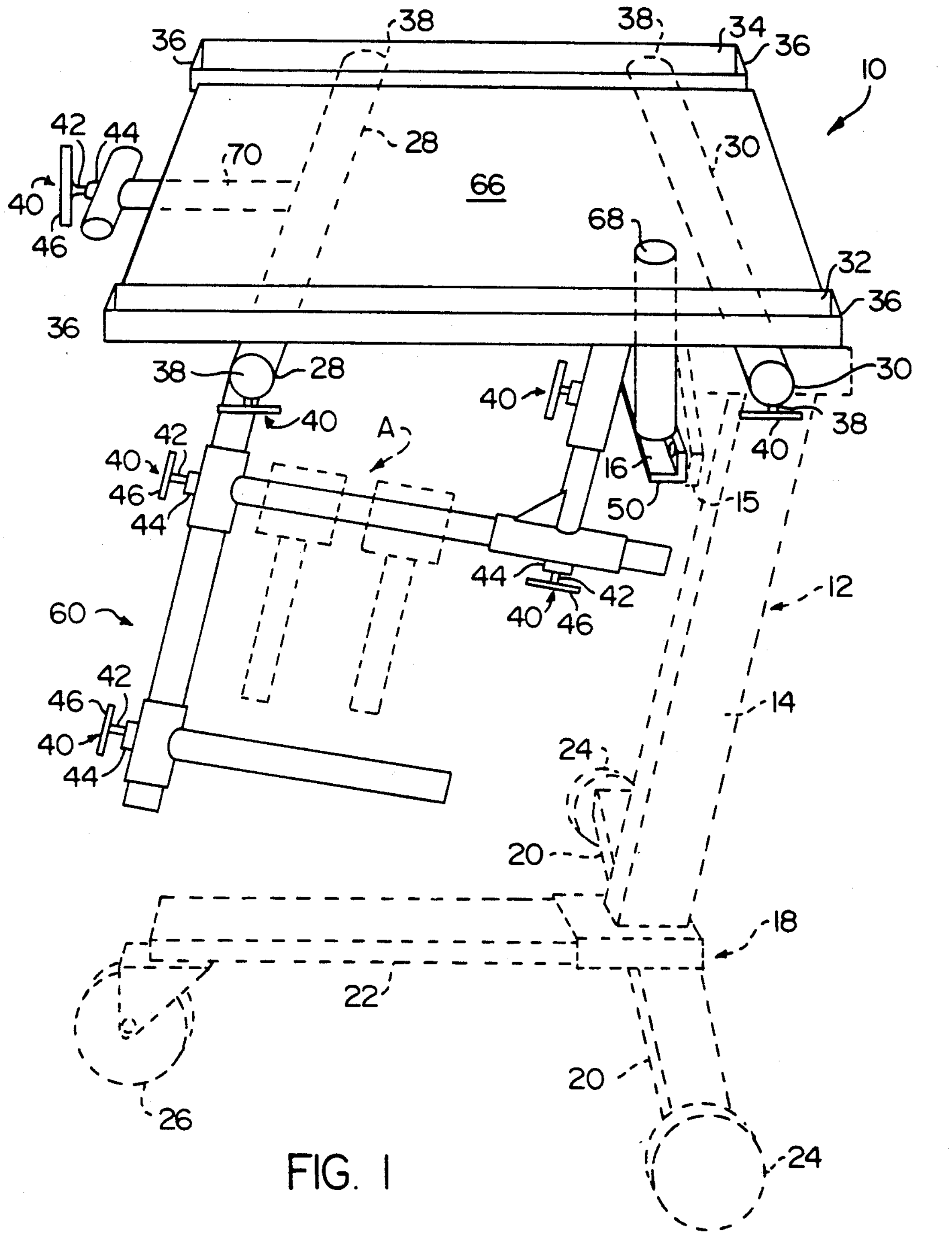
FIG. 1 is a perspective view showing the general arrangement of a preferred embodiment of the invention.

Referring now to the drawing FIGS. 1–4, the invention comprises a worktable 10 affixed to a suitable support member 12 such as an engine stand. The stand is a commercially available product having an upright post 14, a first mounting fixture 15 (which is an engine stand mounting arm) for receiving and supporting the worktable, and a tricycle wheelbase 18 with lateral 20 and longitudinal 22 arms, respectively, for side wheels 24 and a forward castor wheel 26. A series of accessories A are shown as stored under the table when not in use. In this condition, the worktable may be readily moved about from workplace to storage as desired.

Figure 2:
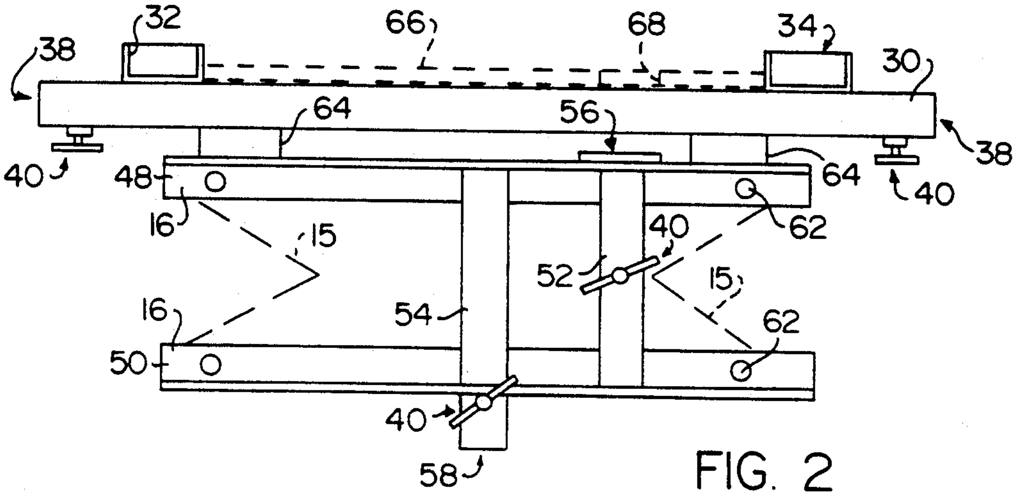
FIG. 2 is an end elevation as viewed from the front of the table showing the arrangement for securing the worktable to a supporting stand.
Figure 3:
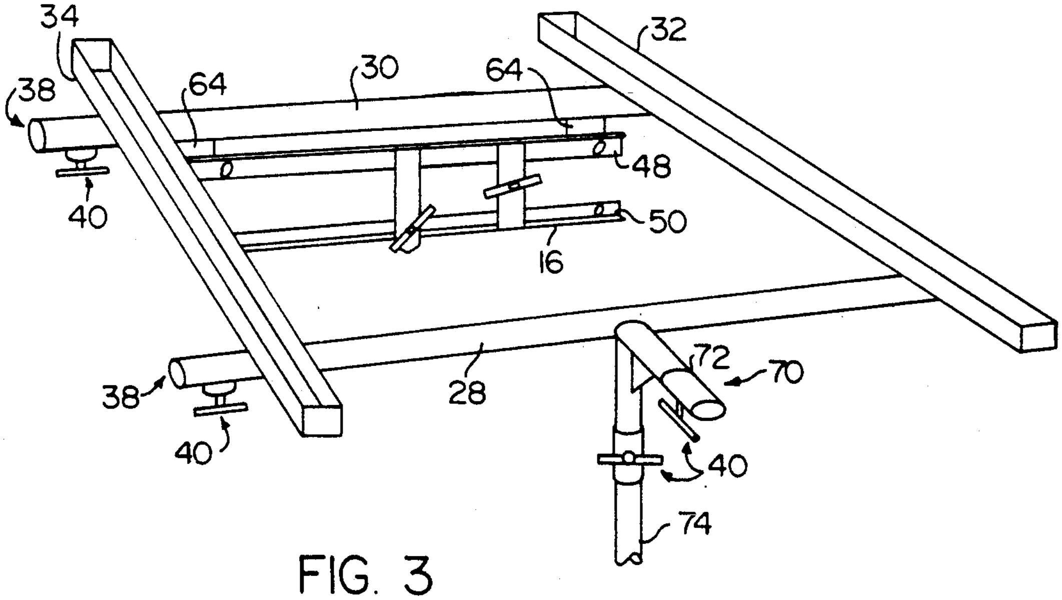
FIG. 3 is a perspective view showing the worktable frame and tubular socket connections serving as accessory connection points.
Figure 4:
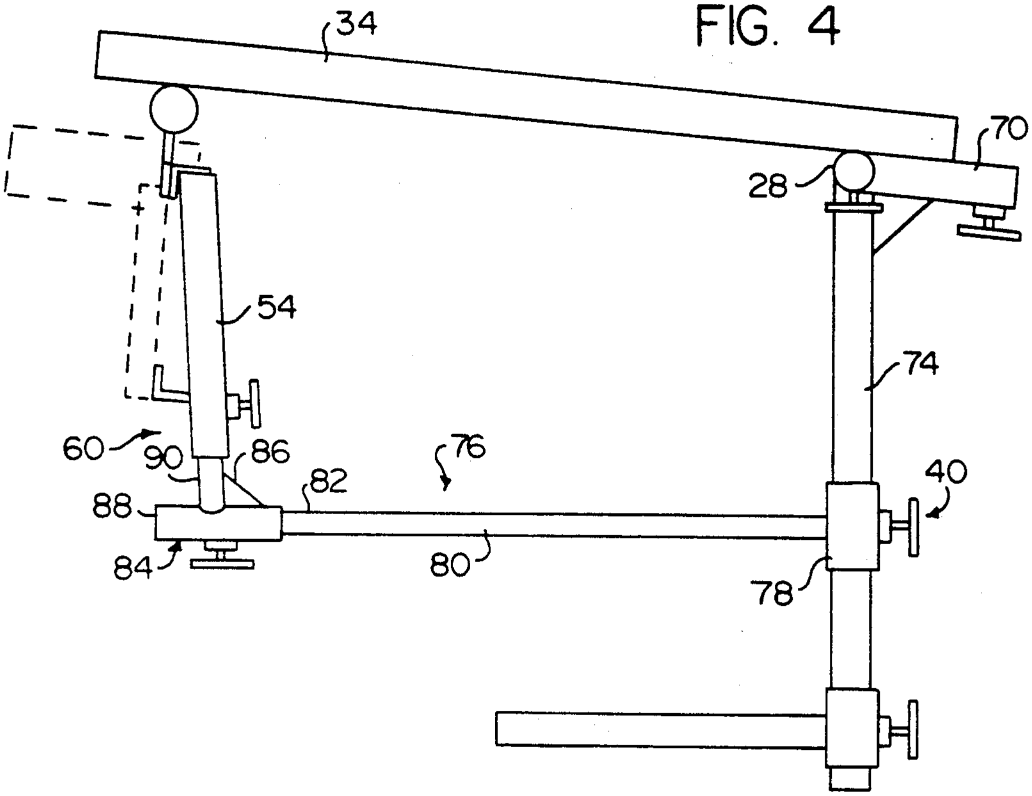
FIG. 4 is a side elevation of the worktable.

As best shown in FIGS. 2-4, the table is preferably of rectangular configuration and comprises front 28 and rear 30 horizontal support tubes affixed to a pair of channels 32, 34 extending along and defining opposite sides of the table. At each corner of the table, the channels pass over the support tubes and are affixed to the tubes by suitable means such as welding. The result is a rigid structure forming the frame of the worktable. As shown, the channels are upwardly open to receive and support a workpiece such as a lawnmower by its wheels. Endplates 36 close the front and rear ends of each channel.

The front and rear support tubes 28, 30 have open ends defining socket connections 38 for receiving accessories. The socket connections are fitted with screw clamps 40 so that an accessory may be fitted into and tightly secured to a socket connection at each corner of the table. Each screw clamp 40 includes a threaded bolt or screw member 42 extending through a threaded embossment 44 fitted to the socket connection. The screw member further includes an external handle 46 and an internal foot (not shown) for engaging and securing an accessory within a socket connection. It is apparent from the drawing that there are several screw clamps 40 associated with both socket connections and accessories. For clarity of description all are referred to using the same reference numeral and may be regarded as having the same construction.

As more fully described below in connection with FIGS. 5 through 11, the accessories form part of the invention as they are of general utility for securing a variety of workpieces to the worktable.

The worktable includes a mounting fixture 16 (which is referred to as a second mounting fixture to distinguish from first mounting fixture 15) shown in FIGS. 2-4 for securing the table to the support stand 12. The mounting bracket includes a pair of horizontally disposed, vertically spaced brackets 48, 50 such as angle irons secured to each other by vertically disposed socket connections 52, 54 comprising open ended tubes secured as by welding to the upper and lower angle irons 48, 50. The socket connection 52 shown to the right in FIG. 2, has an open upper end 56 and a screw clamp 40 for receiving and securing an accessory inserted into the socket from above. The socket connection 54 to the left also includes a screw clamp 40 and has a downwardly open end 58 to receive and secure an accessories rack 60 for storing accessories when not in use. The mounting fixture 16 is secured to the support stand by suitable means such as bolts 62. The upper horizontal end support tube 30 is affixed to the mounting fixture by spaced saddles 64 which are welded in place. By this arrangement the mounting fixture secures the worktable to the stand in cantilever with the table projecting forwardly of the stand.

A removable table surface 66 consisting of suitable material such as plywood, for example, fits into the space defined by the side channels and rests on the forward and rear support tubes. The table surface includes an opening 68 permitting access to the socket connection 52 located under the table surface.

The front support tube 28 includes a horizontal socket connection 70 projecting forwardly from the front edge of the table surface. This socket connection consists of a short section of tubing or pipe 72 affixed to the front support tube and having a screw clamp 40 for securing an accessory when positioned in the clamp. An accessory storage support strut 74 consisting of a tube or pipe projects downwardly from the front support tube and forms part of the accessories storage rack 60. As shown in FIGS. 1, 3, and 4, the accessories storage rack includes a transverse support 76 in the form of a section of tube defining a socket connection 78 and fitted with a screw clamp 40 and with an accessories rack 80. The socket connection 78 is clamped to the support strut 74 with the accessories rack 80 extending rearward under the table. The free end of the rack 82 is, in turn, supported from vertical socket connection 54 by means of an intermediate socket connection 84. The intermediate connection has a reinforcing plate 86 fitted between socket 88 and insert portions 90.

From the foregoing description, it is understood that the socket connections located at the four corners, the front edge, and underneath the worktable receive and tightly hold a variety of accessories of the sort shown in FIG. 5-11 of the drawing. Each of the accessories (except for FIG. 11) includes a socket insert 90 consisting a section of tube or pipe which fits into any one of the socket connections.

Figure 5:
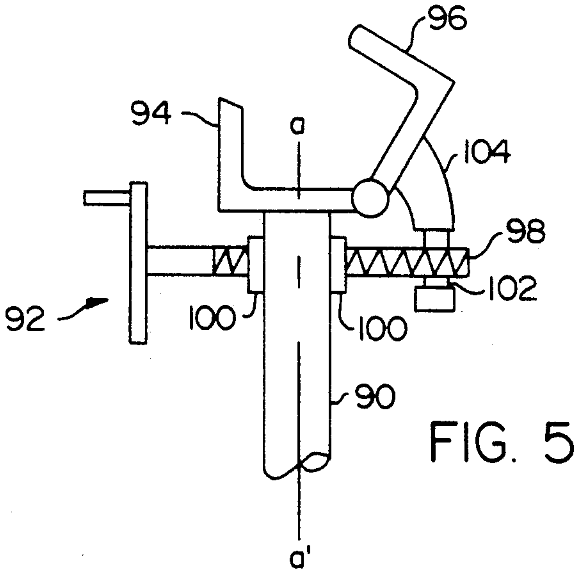

FIG. 5 illustrates a clamp accessory 92 mounted on an insert tube 90 with a fixed jaw 94, and a movable jaw 96 pivoted to the fixed jaw and actuated between open and closed positions by means of a screw member 98 threaded through embossments 100 on the accessory insert 90 and through a self aligning nut 102 fitted to a closure lever 104. This clamp is of robust construction and may be used to mount a workpiece such as a chainsaw on the worktable by gripping the operating handle of the chainsaw.

Figure 6:
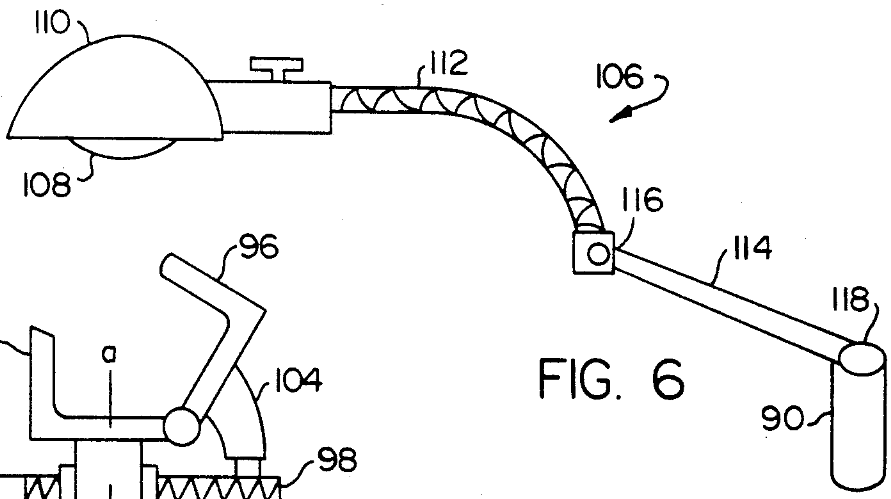
FIGS. 5–11 are views of a variety of accessories for the worktable including (5) screw clamp, (6) lamp, (7) universal tee connection, (8) vise with support stand, (9) viceclamp, (10) tray, and (11) angle iron socket connection.

FIG. 6 illustrates a lamp 106 including electric bulb 108, shade 110, flexible cable 112, an extension arm 114, and an insert 90 for connection to a socket connection on the worktable. The lamp preferably includes swivel connections 116, 118 for ease of positioning the lamp about the worktable.

Figure 7:
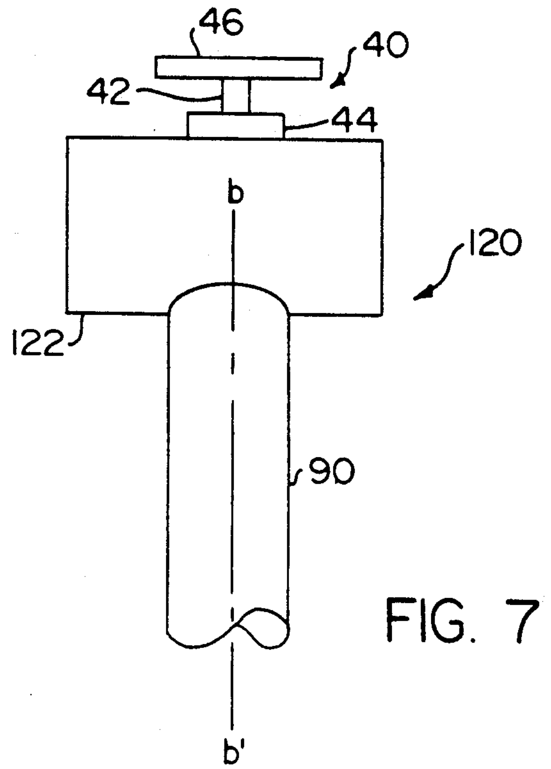

FIG. 7 illustrates a universal socket or tee connection 120 comprising a socket insert 90 affixed to a socket in the form of a section of open ended tube 122 with a screw clamp 40. The universal socket insert fits each of the socket connections of the worktable, and the universal may be rotated through 360 degrees for orienting the socket connection at the most convenient position for receiving and clamping another accessory holding a particular workpiece. For example, the universal may be used with a clamp accessory as shown in FIG. 5 so that the insert axis a—a' of the clamp accessory may be positioned as desired through 360 degrees of a vertical plane perpendicular to the universal axis b—b'.

Figure 8:
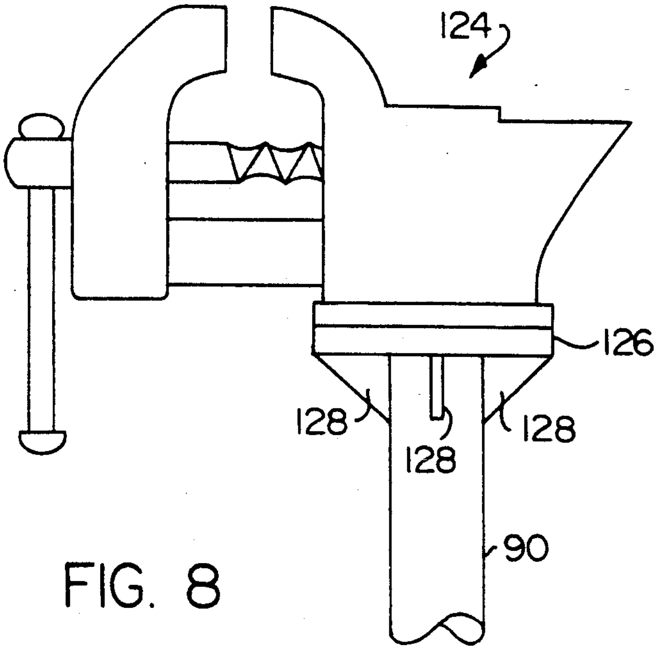

FIG. 8 shows a vise 124 affixed to an insert tube 90 by means of a pedestal 126 and support plates 128. The vise accessory insert is positioned in any socket connection of the worktable as for example the interior table socket connection 52 through its access opening 68 in the table surface. Again the vise accessory may be oriented as desired for a particular repair operation.

Figure 9:
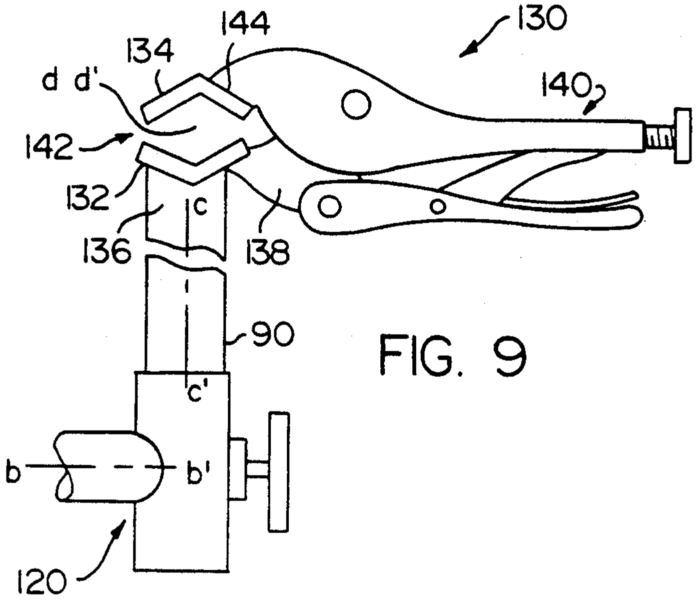

The viseclamp accessory 130 of FIG. 9 comprises a tubular socket insert 90 with a fixed jaw 132 and a movable jaw 134 attached thereto. The fixed or lower jaw comprises a section of angle iron welded both to the working end 136 of the socket insert tube and to the fixed jaw 138 of a visegrip or toggle clamp 140. The moveable angle iron jaw, cooperating with the fixed jaw to define a clamping nip 142, is affixed to the movable jaw 144 of the vise grip. The viseclamp accessory may be mounted directly in one of the socket clamps at a corner of the worktable with the viseclamp axis c—c' extending horizontally and the clamp nip axis d—d' capable of 360 degree orientation in a vertical plane. By using a universal socket connection 120 as shown in FIG. 7 to mount the viseclamp indirectly in a corner socket connection, the axis d—d' of the clamp nip is capable of 360 degree orientation about the socket connection axis b—b'. As a result there is considerable versatility in positioning workpieces using these accessories or a combination thereof.

Figure 10:
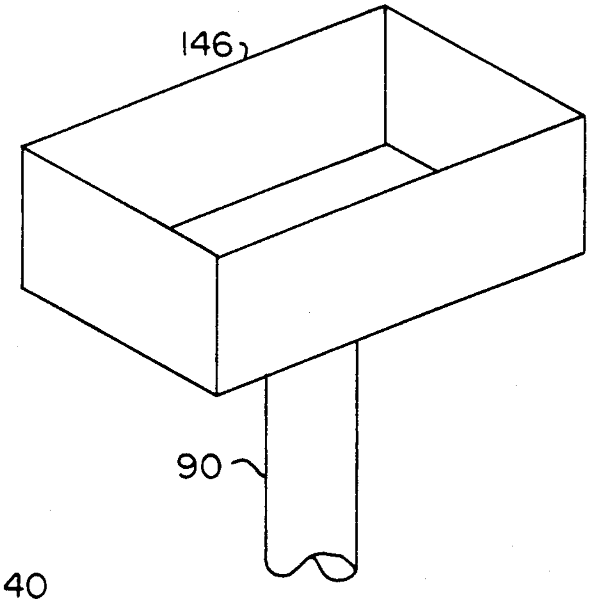

FIG. 10 illustrates a utility tray 146 affixed to a socket insert 90 for holding small tools or collecting parts of a workpiece being serviced on the worktable.

Figure 11:
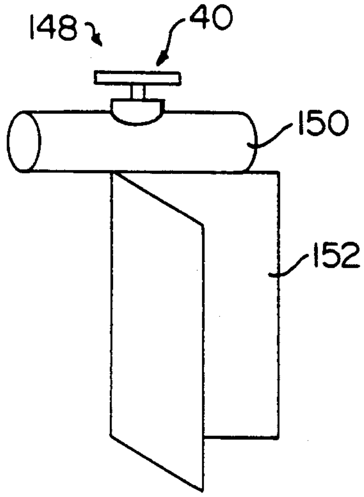

FIG. 11 illustrates an angle iron socket connection 148 comprising a socket tube 150 with screw clamp 40 affixed to an angle iron 152. This accessory is useful with the vise of FIG. 8 for clamping the angle iron 152 so that the socket connection 148 may receive an accessory such as a viseclamp of FIG. 9 bearing a workpiece.

FIGS. 1 and 4 illustrate the under-table storage components comprising downwardly directed socket connection receiving a universal socket with reinforcement plate together with a second universal socket serving as a storage rack. Accessories are stored by attaching them to the rack. The lower end of the vertical insert tube receives and stores a spare universal socket connection. As noted, the worktable with stored accessories may be rolled to a convenient worksite or to storage when not in use.

A worktable according to the invention accommodates many different kinds of tools, appliances, and equipment in need of servicing or repair including disassembly, inspection, and replacement of worn parts as well as repairs requiring working operations such as welding, soldering, sawing, drilling, and so forth. These servicing and working operations normally require considerable skill and care as well as attention to detail. The invention now enables the craftsman in dealing with a most important factor in any job: the correct and secure positioning of a workpiece for repair or servicing.

I claim:

1. A worktable comprising a stand having a tricycle wheel base with lateral arms having side wheels and a longitudinal arm having a forward castor wheel, an upright post mounted on the base at the junction of the lateral and longitudinal arms, the post having at its upper end a first mounting fixture for supporting a worktable, the worktable having a table frame with spaced, horizontally disposed support members defining front and rear supports for a table surface, and spaced horizontally disposed upwardly open side channels defining the side margins of the table surface, each of the side channels being affixed at opposite ends to the support members to form a rigid table frame with a plurality of corners, a second mounting fixture secured to the rear support member and having means for securement to the first mounting fixture so that the table frame projects cowardly from the upright post over the wheel base, at least one of the support members having an opening defining a socket connection located at a corner of the table, a workpiece accessory received by and secured to the socket connection, and a table surface fitted into the space between the side channels and supported by the front and rear support members.

2. A worktable as defined in claim 1 in which the accessory comprises a universal tee connection for mounting accessories in a worktable socket connection.

3. A worktable as defined in claim 1 in which the accessory comprises an electric lamp fitted with an insert received by a socket connection.

4. A worktable as defined in claim 1 in which the accessory comprises a vise affixed to an insert received by a socket connection.

5. A worktable as defined in claim 1 in which the accessory comprises a viceclamp fitted with an insert received by a socket connection.

6. A worktable as defined in claim 1 in which the accessory comprises a toggle clamp fitted with an insert received by a socket connection.

7. A worktable as defined in claim 1 in which the accessory comprises a tray fitted with an insert received by a socket connection.

8. A worktable as defined in claim 4 which further includes an angle iron with a captive socket connection secured in the vise and defining an intermediate accessory for mounting another accessory.

9. A worktable as defined in claim 1 which further includes a socket connection secured to the forward support member and projecting forwardly from the worktable.

10. A worktable as defined in claim 1 which further includes a socket connection secured to the second mounting fixture and projecting upwardly to receive an accessory through the worktable surface.

11. A worktable as defined in claim 1 which further includes a storage rack for holding accessories including a downwardly open socket connection affixed to the second mounting fixture, a support insert extending downwardly from the front support member, and a transverse bar defining a storage rack interconnecting the insert and the socket connection for receiving and storing accessories under the worktable.

12. A worktable as defined in claim 1 in which the table surface is removable.

* * * * *